(12) United States Patent
Casaccia et al.

(10) Patent No.: US 7,486,956 B2
(45) Date of Patent: Feb. 3, 2009

(54) CHANNEL ESTIMATION AND CHANNEL QUALITY INDICATOR (CQI) MEASUREMENTS FOR A HIGH-SPEED DOWNLINK GPRS

(75) Inventors: Lorenzo Casaccia, San Diego, CA (US); Durga Prasad Malladi, San Diego, CA (US); Francesco Grilli, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 220 days.

(21) Appl. No.: 10/850,310

(22) Filed: May 19, 2004

(65) Prior Publication Data
US 2005/0260998 A1    Nov. 24, 2005

(51) Int. Cl.
*H04Q 7/20*    (2006.01)
(52) U.S. Cl. .................. 455/452.2; 455/450; 455/452.1
(58) Field of Classification Search .................. 455/423, 455/456.4, 10, 517, 522, 63.1, 67.11, 67.13, 455/69, 70, 78, 572, 574, 127.5, 226.3, 226.4, 455/230, 234.1, 296, 297, 347.2, 452.1, 452.2, 455/450; 370/280, 332, 436
See application file for complete search history.

(56) References Cited

U.S. PATENT DOCUMENTS

| | | | | |
|---|---|---|---|---|
| 5,204,855 | A * | 4/1993 | Bebee et al. ................. | 370/436 |
| 5,493,563 | A * | 2/1996 | Rozanski et al. ............. | 455/437 |
| 6,224,057 | B1 | 5/2001 | Morton ........................ | 273/272 |
| 6,748,220 | B1 | 6/2004 | Chow et al. .................. | 455/450 |
| 6,760,311 | B1 * | 7/2004 | Raith .......................... | 455/522 |
| 2002/0168944 | A1 | 11/2002 | Terry et al. ................. | 455/67.1 |
| 2003/0073409 | A1 * | 4/2003 | Nobukiyo et al. .......... | 455/67.1 |
| 2003/0232625 | A1 * | 12/2003 | Bhushan et al. ............. | 455/509 |
| 2005/0026566 | A1 * | 2/2005 | Dabak et al. ............. | 455/67.11 |

FOREIGN PATENT DOCUMENTS

| | | |
|---|---|---|
| EP | 1199848 A | 4/2002 |
| EP | 1411668 A | 4/2004 |
| WO | 02093757 | 11/2002 |
| WO | 02093951 | 11/2002 |

OTHER PUBLICATIONS

L.M. Nevdyaev, Telecommunication Technologies, Moscow, Svyaz' I Biznes, 2002, p. 209.
International Search Report—PCT/US05/015049, International Search Authority—European Patent Office—Dec. 12, 2005.

* cited by examiner

*Primary Examiner*—Sam Bhattacharya
(74) *Attorney, Agent, or Firm*—Larry J. Moskowitz; Thomas Rouse

(57) ABSTRACT

An apparatus for providing a Time Division Multiplexing (TDM) scheme for link adaptation including use of channel estimation and Channel Quality Indicator (CQI) measurements by bundling several timeslots of a frame within the existing GSM/GPRS/EDGE system. An algorithm for providing rotation of MS users such that each one will benefit from measuring all timeslots of the frame resulting in more reliable and accurate transmission of information.

28 Claims, 14 Drawing Sheets

CHANNEL ESTIMATION AND CHANNEL QUALITY INDICATOR (CQI) MEASUREMENTS FOR A HIGH-SPEED DOWNLINK GPRS

BACKGROUND

1. Field

The present invention relates to wireless communication systems generally and specifically to scheduling data transmissions in a Global System for Mobile communications referred to as GSM.

2. Background

The Global System for Mobile communications (GSM) wireless telecommunications standard defines a set of widely available digital communications protocols for use within a digital wireless telephone system. The GSM specifications are developed by an international effort and adopted by the European Telecommunications Standard Institute (ETSI, 06921 Sophia Antipolis Cedex, France). The General Packet Radio Service (GPRS) is a set of new GSM bearer services that provides high-speed packet-mode transmission within the Public Land Mobile Network (PLMN) and towards external networks. And, the Enhanced Data rates for a Global Evolution (EDGE) were introduced to improve circuit switch and packet switch GSM data services. At the time of inception of the GSM/GPRS/EDGE standard, which supports voice and high rate packet data services, the use of Time Division Multiple Access (TDMA) within the GSM/GPRS/EDGE Over-The-Air (OTA) protocol increased the efficiency with which the given radio frequency bandwidth could be used to conduct wireless telephone calls. Even increasing services and demand require efficient ways of providing system resources to more and more data users. There is a need, therefore, to provide high speed data transmissions in a GSM/GPRS/EDGE environment.

SUMMARY

The embodiments disclosed herein address the above stated needs by providing an apparatus that provides a Time Division Multiplexing (TDM) scheduling scheme including use of channel estimation and Channel Quality Indicator (CQI) measurements by bundling several timeslots of a frame within the existing GSM/GPRS/EDGE framework.

One embodiment provides an apparatus, in a wireless communication system supporting voice and high packet data services, which performs channel estimation, determines a Channel Quality Indicator (CQI) index, and returns assignment/data information based on the CQI index. According to this embodiment, an algorithm enables rotation of Mobile Station (MS) users such that each one will benefit from measuring all timeslots of the frame resulting in more reliable and accurate transmission of information.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
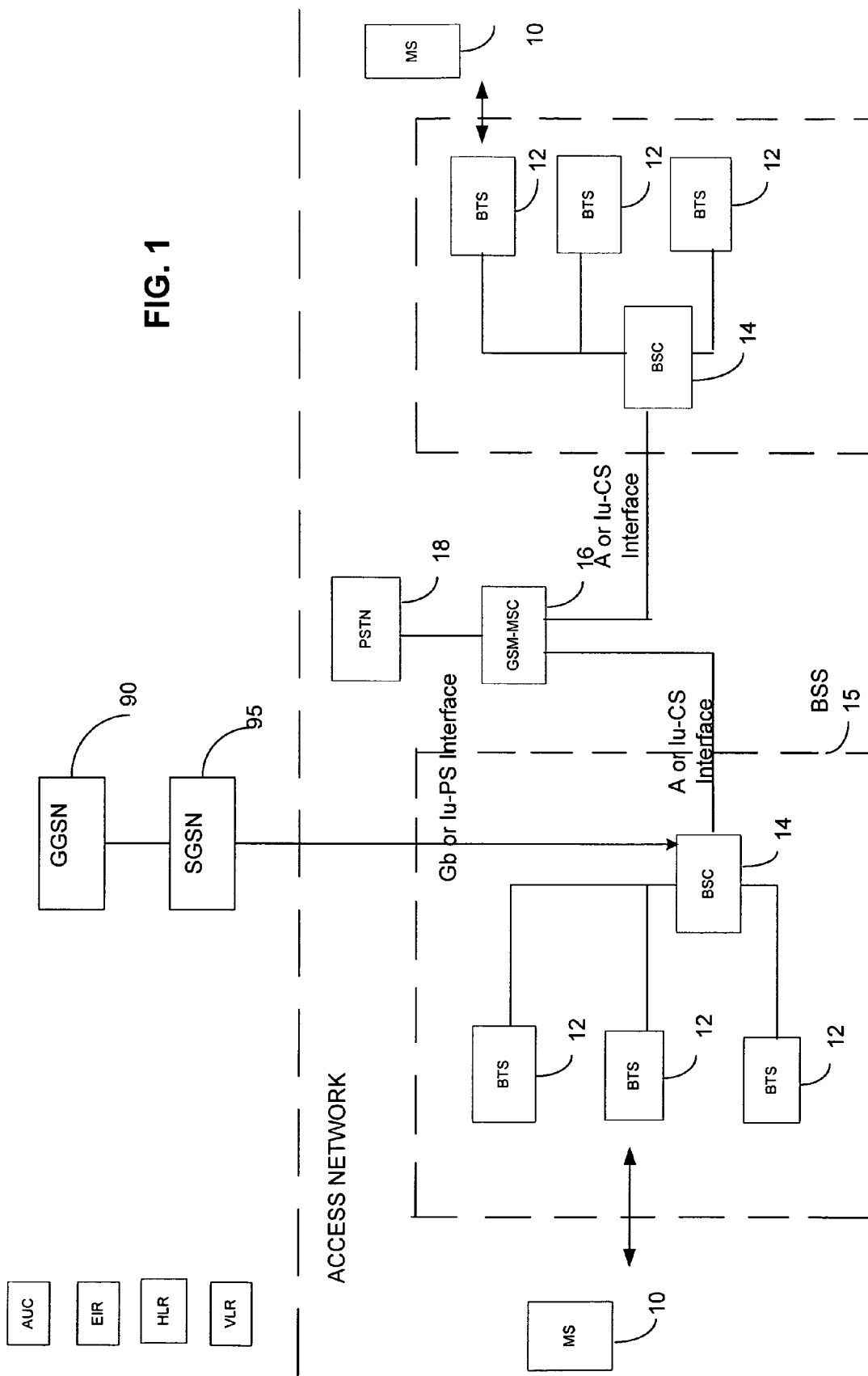
FIG. 1 is a block diagram of a cellular telephone system configured in accordance with the GSM/GPRS/EDGE standards.

The word "exemplary" is used exclusively herein to mean "serving as an example, instance, or illustration." Any embodiment described herein as "exemplary" is not necessarily to be construed as preferred or advantageous over other embodiments. While the various aspects of the present invention are presented in the drawings, the drawings are not necessarily drawn to scale unless specifically indicated.

The present invention relates to bundling several timeslots of a frame together in order to estimate a channel's quality and to send assignment and data information to the mobile station (MS) with a good channel quality within the existing GSM/GPRS/EDGE system. One embodiment also provides an algorithm which enables rotation of MS users such that each one will benefit from measuring all timeslots of the frame resulting in more reliable and accurate transmission. In a high rate packet data system, upon receipt of the paging messages from one or more base stations, the MS measures the Signal-to-Noise-and-Interference Ratio (SNIR) of the forward link signals and sends a Channel Quality Indicator (CQI) to the Base Station (BS) at each frame or bundle of timeslots. This BS, in turn, sends assignment/data information to the MS which has good channel quality.

The following discussion develops the preferred embodiment by first presenting a system supporting a GSM/GPRS/EDGE system. Next, a TDM scheduling scheme for link adaptation is introduced. Then the TDM scheduling scheme, which includes use of channel estimation experienced by each mobile station and which may be used by the scheduler to optimally allocate the radio resources is explained. Finally, it is helpful to discuss how this TDM scheduling scheme may be implemented into the GSM/GPRS/EDGE system and provide the above-mentioned benefits.

Note the embodiments are provided as exemplars throughout this discussion; however, alternate embodiments may incorporate various aspects without departing from the scope of the present invention. Specifically, the present invention is applicable to a data processing system, a wireless communication system, a unidirectional broadcast system, and any other system desiring efficient transmission of information.

Global System for Mobile Communications (GSM)

The Global System for Mobile communications (GSM) wireless telecommunications standard is set of widely available digital communications protocols for use within a digital wireless telephone system. The GSM specifications were developed by an international effort and have been adopted by the European Telecommunications Standard Institute (ETSI, 06921 Sophia Antipolis Cedex, France). The General Packet Radio Service (GPRS) is a set of new GSM bearer services that provides high-speed packet-mode transmission within the PLMN and towards external networks. And, the Enhanced Data rates for a Global Evolution (EDGE) was introduced to improve circuit switch and packet switch GSM data services. A wireless telephone system configured in a manner consistent with the use of the GSM/GPRS/EDGE standards is shown in FIG. 1. GSM Mobile-services Switching Center (MSC) 16 switches or connects telephone calls between the wireless system access network, namely the Base Station Subsystems (BSS) 15, and wireline based Public Switched Telephone Network (PSTN) 18, which may also be a Public Land Mobile Network (PLMN). GSM MSC 16 provides telephone switching, billing, subscriber unit tracking, subscriber unit authorization, and some handoff control functionality.

BSS 15 is comprised of base station controller (BSC) 14 and any base transceiver station(s) (BTS) 12 coupled thereto. As defined in the GSM specifications, the interface between GSM MSC 16 and BSS 15 is referred to as the GSM "A or Iu-CS interface," which separates the GSM/GPRS/EDGE network switching equipment from the Time Division Multiple Access (TDMA) based radio equipment. BSC 14 is involved with handoff processing and signal processing resource allocation within BTSs 12 so that multiple subscriber units 10, also referred to as Mobile Stations (MSs), can conduct telephone calls simultaneously. BTS 12 interfaces the subscriber units 10 via radio frequency (RF) signals and a well defined OTA protocol to the GSM/GPRS/EDGE wireless network. BTS 12 comprises radio transmission and reception devices, up to and including antenna devices, and also all the signal processing specific to the radio interface. BTSs can be considered as complex radio modems. Subscriber unit MS 10 provides radio and processing functions to access the GSM/GPRS/EDGE network through the radio interface to either the user of subscriber unit 10 or some other terminal equipment, such as a facsimile machine or personal computer. A particular subscriber unit MS 10 may switch the BTS 12 with which it interfaces as its location changes, but can only communicate with one BTS 12 at a given instant. Within this application, the capability to switch from one BTS 12 to another BTS 12, where only one radio interface exists at any instance, is referred to as subscriber unit hard handoff.

To make a wireless telephone call, a network connection must be established between subscriber unit 10, often referred to as a "mobile unit," and PSTN 18. PSTN 18 is the conventional wireline telephone system. To conduct the telephone call in a mobile fashion, a portion of the network connection is formed via the exchange of Radio Frequency (RF) signals between subscriber unit 10 and BTS 12. The remaining portion of the network connection is typically formed through wire-based connections that pass through BSS 15 and through GSM MSC 16. In accordance with the GSM/GPRS/EDGE OTA protocol, which is one of the protocols that make up the GSM/GPRS/EDGE wireless telecommunications standard, TDMA technology is used to establish a set of channels within the above identified RF signals used to interface a subscriber unit 10 with a BTS 12. These channels are used to separate and distinguish the various sets of data associated with the various telephone calls being made at any given time. The various sets of data include user data which normally takes the form of digitized audio information, and signaling data which is comprised of the signaling messages used to orchestrate the processing of a telephone call.

At the time of the inception of the GSM/GPRS/EDGE standard, the use of TDMA within the GSM/GPRS/EDGE OTA protocol increased the efficiency with which the given radio frequency bandwidth could be used to conduct wireless telephone calls with respect to older analog cellular systems. Increasing the efficiency with which the available radio frequency bandwidth is used is desirable because only a limited amount of RF bandwidth exists, and the amount of bandwidth is usually the limiting factor as to the number of calls that can be conducted by a particular wireless cellular telephone system. Since the inception of the GSM/GPRS/EDGE wireless telecommunications protocol, however, other wireless technologies have been perfected that allow a greater number of telephone calls to be conducted in a given RF bandwidth. Since efficient use of radio frequency bandwidth is highly desirable, the use of these more efficient technologies is now preferred. The GSM/GPRS/EDGE system supports transmission and reception of voice, high speed circuit switch data and high speed packet data.

Figure 2:
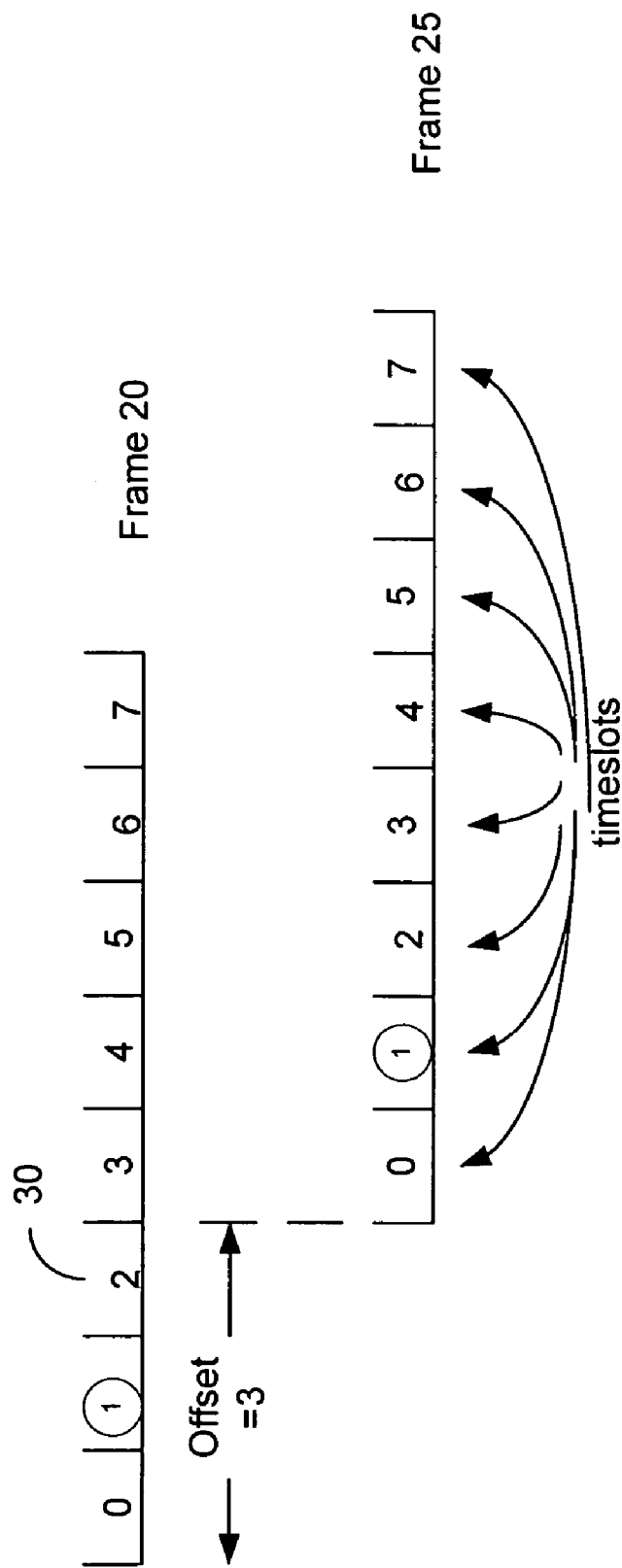
FIG. 2 is a diagram illustrating the case of voice services being sent on timeslot 1 of the transmitting unit (Tx) frame and being received on timeslot 1 of the receiving unit (Rx) frame viewed from the base station.

FIG. 2 is a diagram illustrating voice data sent on timeslot 1 of the transmitting unit (Tx) frame 20. Note that transmission and reception of information are viewed from the Base Station (BS). Since voice data has to be transmitted and received on the same timeslot, this data will be received on timeslot 1 of the receiving unit (Rx) frame 25. One frame 20 is made up of eight timeslots. Note timeslot 30 is identified for clarity. An architectural offset of three timeslots between the Tx and the Rx is required because the data cannot be transmitted and received at the same time. That is, the data is received on frame 25 with an offset of three timeslots. The information is received in the same order sent. This offset includes at least one timeslot 30 to allow for transition between transmission and reception of the data. The BS notifies the MS of the assignment of the timeslot receiving data. The upper layer signaling in the BS enables reservation of the timeslot.

Figure 3:
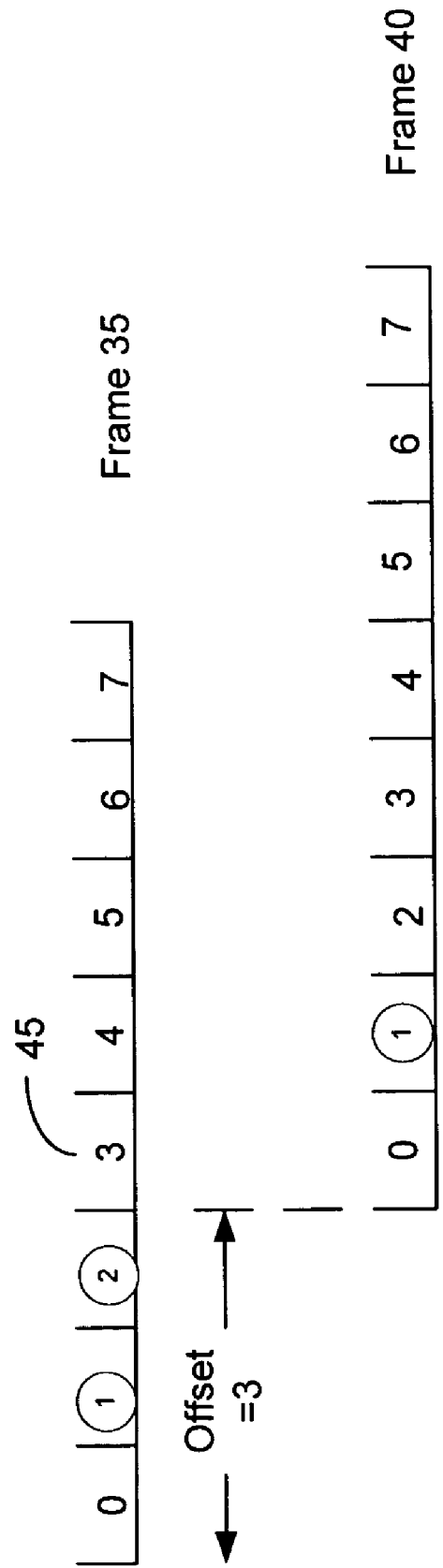
FIG. 3 is a diagram illustrating the case of high speed circuit switch data being sent on timeslots 1 and 2 of the transmitting unit (Tx) frame and being received on timeslot 1 of the receiving unit (Rx) frame viewed from the base station.

FIG. 3 is a diagram illustrating high speed circuit switch data sent on timeslots 1 and 2 of the transmitting unit (Tx) frame 35. The high speed circuit switch data, which uses timeslots, will be received on timeslot 1 of receiving unit (Rx) frame 40. Again, eight timeslots form a frame 35 and an offset of three timeslots between the Tx frame 35 and the Rx frame 40 is used because the data cannot be transmitted and received at the same time. Usually only one timeslot, i.e. timeslot 45, is used for transition between the transmission and reception states. This configuration enables more flexibility since the data is spread over two timeslots for transmission of data and spread over one timeslot for reception. Note that this configuration is unnecessary when voice is sent because the number of additional timeslots does not affect the quality of transmission or reception. As mentioned above, only one timeslot is needed for transmission and only one is needed for reception. Again, the BS notifies the MS of the assignment of the timeslots receiving data until the assignment is deallocated. The upper layer signaling in the BS enables reservation of the timeslots.

Figure 4:
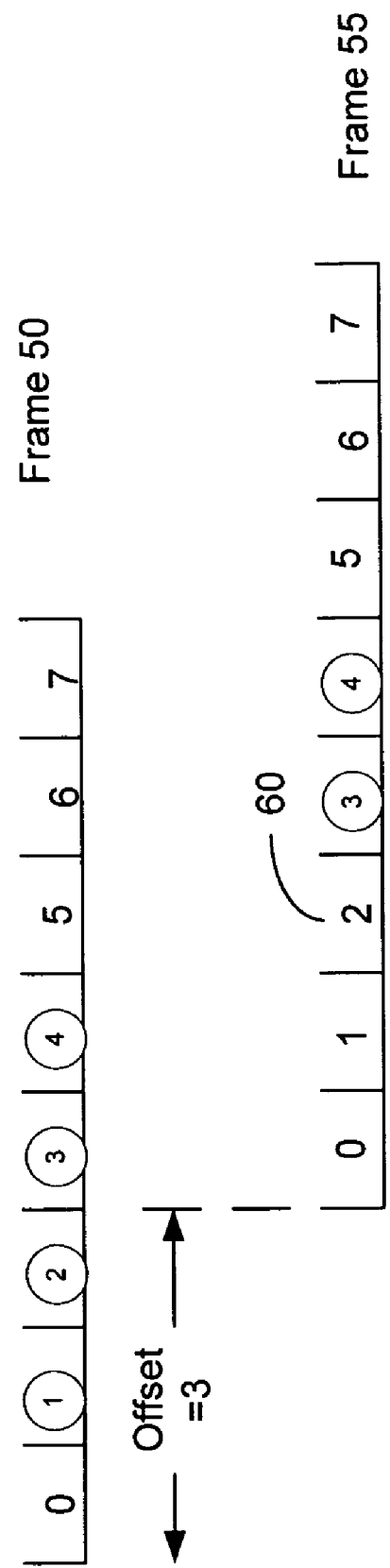
FIG. 4 is a diagram illustrating the case of high speed circuit switch data being sent on timeslots 1, 2, 3, and 4 of the transmitting unit (Tx) frame and being received on timeslots 3 and 4 of the receiving unit (Rx) frame viewed from the base station.

FIG. 4 illustrates the case where the maximum number of timeslots is used for transmission of high speed circuit switch data. This configuration enables even more flexibility since the data is spread over a maximum number of timeslots. This data is transmitted on timeslots 1, 2, 3, and 4 of the Tx frame 50 and received on timeslots 3 and 4 of the Rx frame 55. Again, eight timeslots form a frame 55 and an offset of three timeslots between the Tx and the Rx is required because the data cannot be transmitted and received at the same time. Timeslot 60 is used to switch from transmission to reception. Again, the BS notifies the MS of the assignment of the timeslots receiving data. The upper layer signaling in the BS enables reservation of the timeslots.

Figure 5:
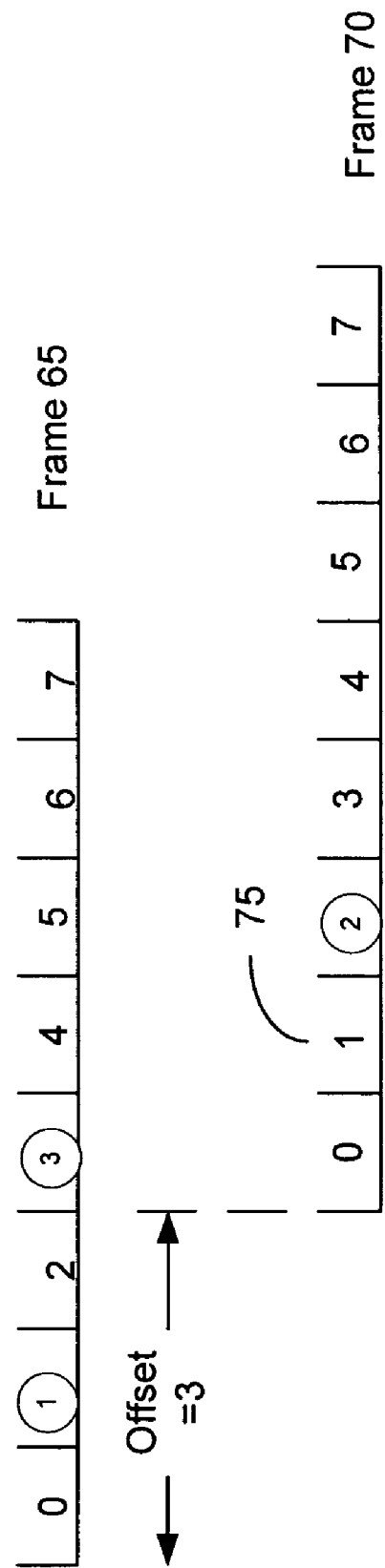
FIG. 5 is a diagram illustrating the case of high speed packet data being sent on timeslots 1 and 3 of the transmitting unit (Tx) frame and being received on timeslot 2 of the receiving unit (Rx) frame.

The General Packet Radio Service (GPRS) is a set of new GSM bearer services that provides high-speed packet-mode transmission within the PLMN and towards external networks, as shown in FIG. 1. GSM was designed for voice, but with circuit data capabilities. On the other hand, GPRS is designed for packet data. In GPRS, the core GSM access technology is maintained with 200 kHz carriers, though new GPRS radio channels are defined. The allocation of these channels is flexible: from 1 to 8 radio interface timeslots allocated per TDMA frame. A rate of ≈21 kbps per timeslot and eight timeslots gives a maximum raw data rate of ≈170 kbps for GPRS. The Enhanced Data rates for Global Evolution (EDGE) were introduced to improve circuit switch and packet switch GSM data services. EDGE introduces a new modulation technique known as 8-phase shift keying (8PSK). The 8PSK application allows scheduling the mobile stations in good channel condition. By using 8PSK, the peak and the average throughput of the base station is increased. The timeslots are assigned as needed and on demand. GPRS also allows dynamic sharing of the physical channels or timeslot (s) between users. FIG. 5 illustrates the example where timeslots 1 and 3 are used to transmit the data on the BS Tx frame 65 and timeslot 2 is used to receive the data on the BS Rx frame 70. An offset of three timeslots between the BS Tx and the BS Rx is required by terminals that cannot transmit and receive data at the same time, which is currently the totality of commercial GSM/GPRS/EDGE terminals. Note the offset is a factor in existing systems, however the present invention is not limited to systems employing such an offset. Timeslot 75 is used to switch from transmission to reception. As observed in FIG. 5, timeslots on the BS Tx frame 65 that are used for transmission need not be consecutive since dynamic sharing is allowed between users. The upper layer signaling in the BS makes an assignment where it selects a pool of MS users. Then, with the help of in-band signaling, it makes an allocation where it selects a single MS user in the pool of users. This assignment is not permanent since it is performed on a frame by frame basis.

As mentioned above, FIG. 1 demonstrates the interaction between the various components of the GSM/GPRS/EDGE system. The MS 10 differs in many ways from the MS for voice and circuit data services described above. The MS 10 has multi-slot capability which allows increased flexibility and capability. For example, significant differences in the maximum number of slots that can be used for sending/receiving data and in the minimum number of slots separating reception/transmission can be observed. The Serving GPRS Support Node (SGSN) 95 is the node that is serving the MS 10. The SGSN 95 establishes a mobility management context containing information pertaining to mobility and security for the MS 10. The SGSN 95 also collects charging information. The Gateway GPRS Support Node (GGSN) 90 is the node that is accessed by an external packet data network, via the Gb-interface. Routing information stored in the GGSN 90 is used to tunnel user data to the MS 10's current point of attachment, i.e. the SGSN 95. The GGSN 90 also collects charging information. In a conventional GSM/GPRS/EDGE system, a scheduler that determines the timeslot to be used by each terminal is located in base station controller (BSC) 14. As will be described below, in the present invention, the scheduler is located in the base station (BTS) 12 to provide for fast scheduling.

Figure 6:
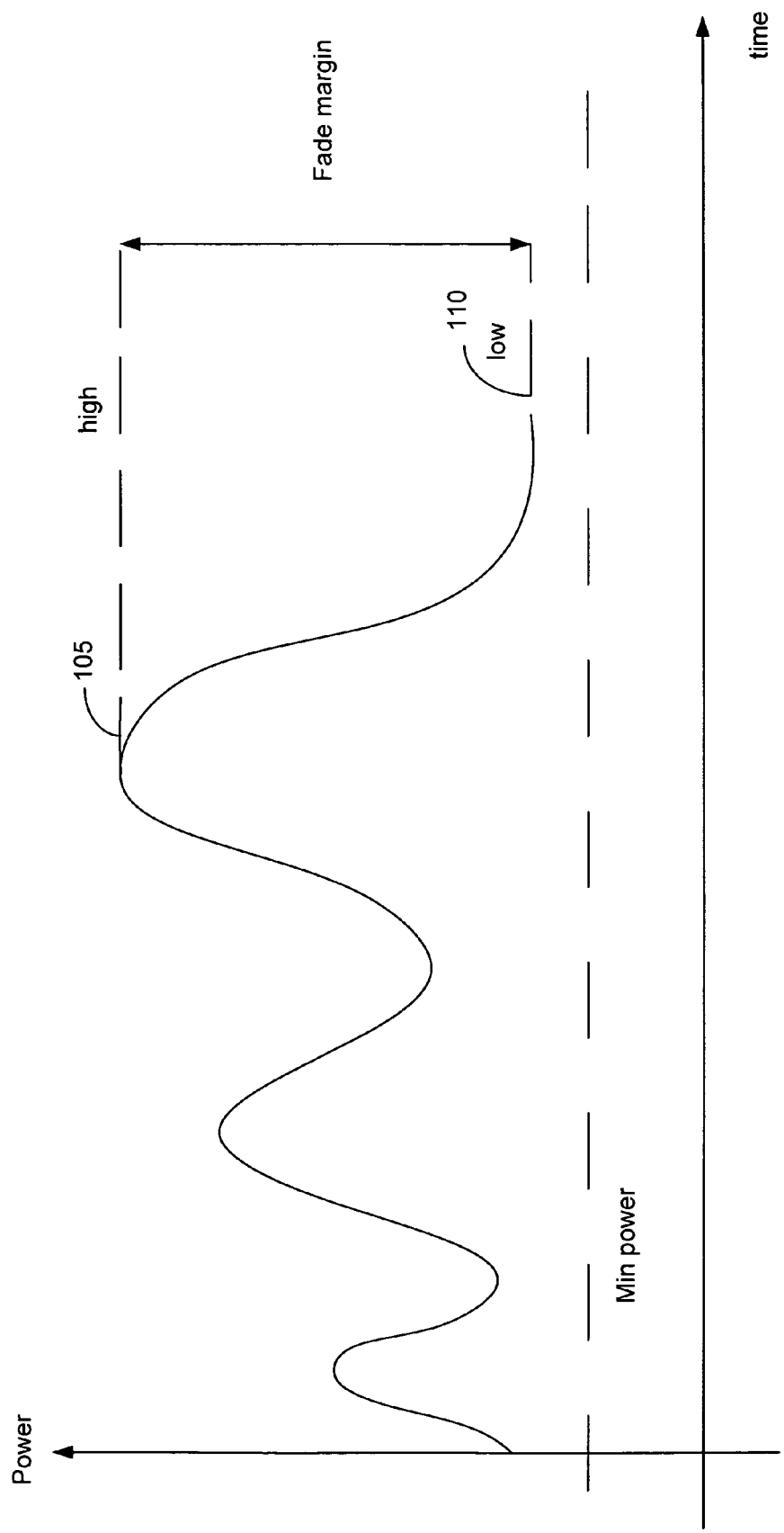
FIG. 6 is a diagram of the received power in a MS with respect to time.

In FIG. 6, the power received at the MS 10 is plotted against time. A fade margin, which represents fading of the channel, can be calculated between the highest point of power 105 and the lowest point of power 110. Since this fade margin becomes much smaller in a TDM scheduling scheme described below, it is beneficial to use this known technique within the existing GSM system in order to improve system performance and signal quality.

TDM Scheduling Scheme for Link Adaptation

In accordance with the embodiment of the data communication system of the present invention, downlink data transmission occurs from one BTS 115 to one MS 125 (see FIG. 8) at or near the maximum data rate which can be supported by the downlink and the system, including the possible use of higher order modulation (8PSK) that allows higher data rates in EDGE. Uplink data communication can occur from one MS 120 to one or more BTS 115. Data is partitioned into data packets being transmitted over one or more timeslots. At each frame or multislot, the BTS 115 can direct data transmission to any MS 120, 125 which is in communication with the BTS 115.

Figure 7:
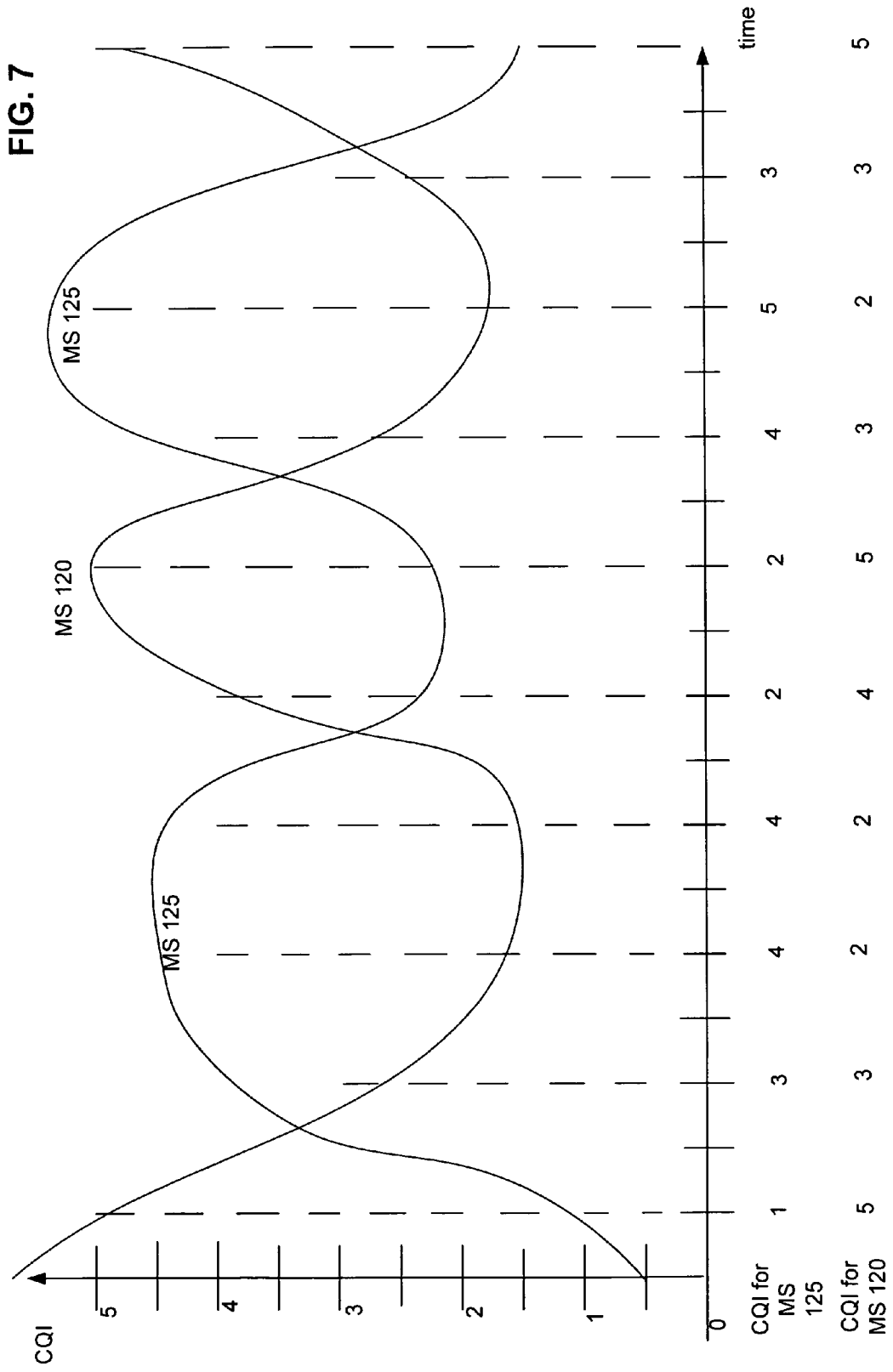
FIG. 7 is a diagram of the CQI for two mobile stations, with respect to time.

Initially, each MS 120, 125 establishes communication with a BTS 115 using a predetermined access procedure. In this connected state, the MS 120, 125 can receive data and control messages 127 from the BTS 115, and is able to transmit data and control messages 127 to the BTS 115. The MS 120, 125 then monitors the down link for transmissions from the base stations in the active set of the MS 120, 125. Specifically, the MS 120, 125 measures the signal-to-noise-and-interference ratio (SNIR) of the down link pilot from the serving base stations, as received at the MS 120, 125. Depending on the received SNIR, the MS 120, 125 will send a Channel Quality Indicator (CQI) back to the BTS 115. As shown in FIG. 7, each MS 120, 125 will send a CQI to the BTS 115 at each time frame.

Figure 8:
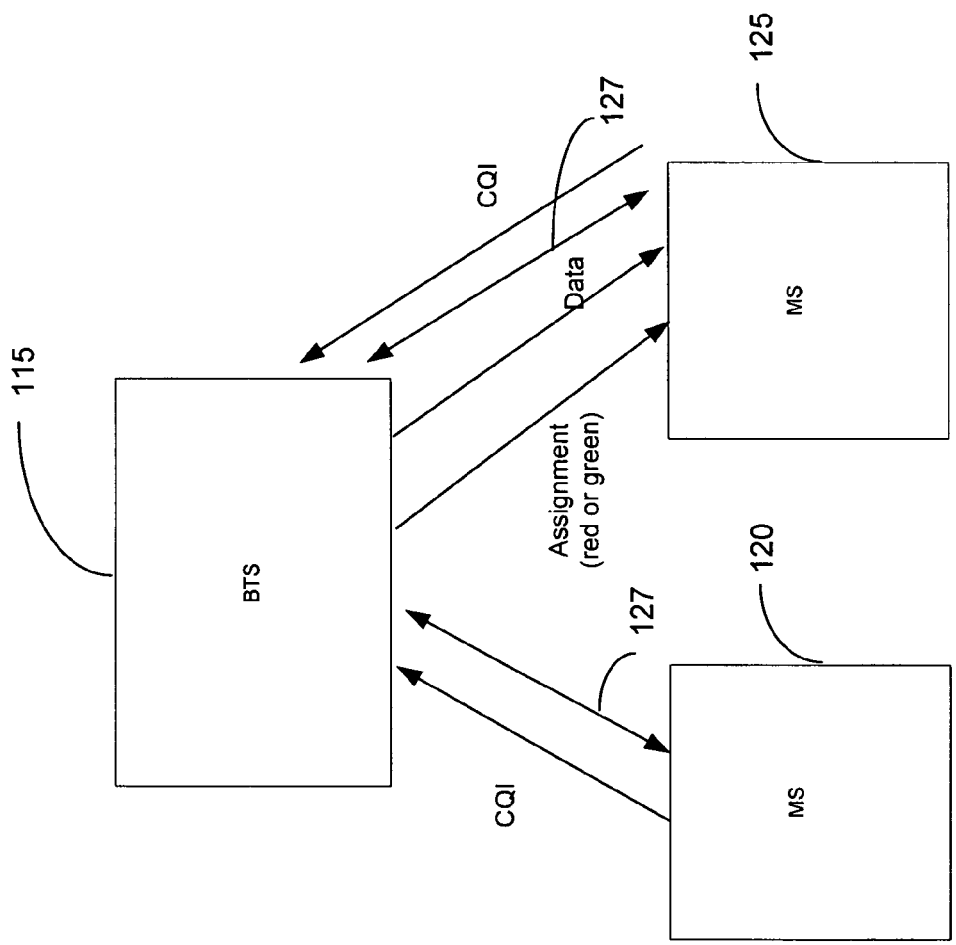
FIG. 8 is a block diagram illustrating the assignment and data sent to the MS based on the CQI received by the BS.
Figure 9:
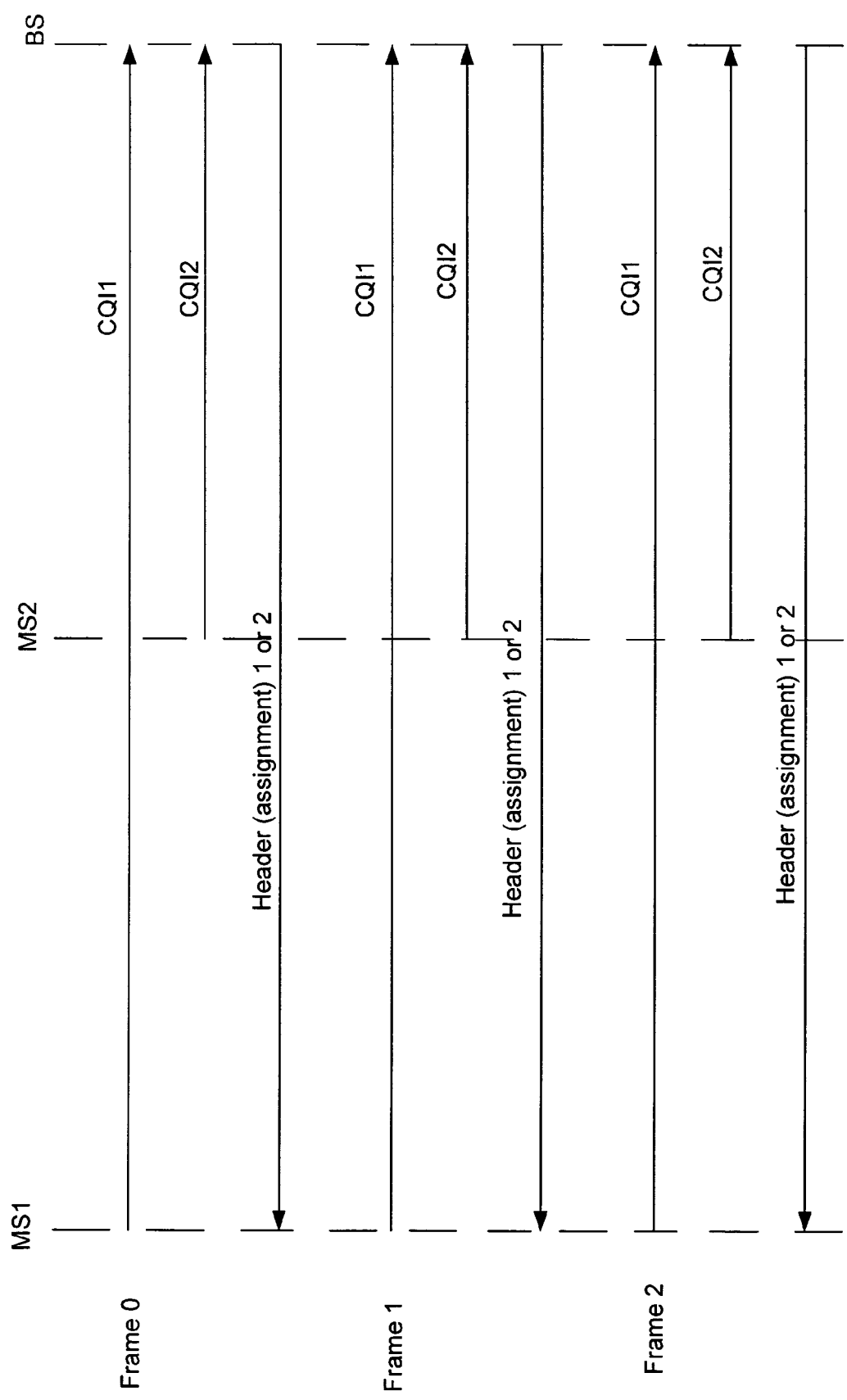
FIG. 9 is a diagram illustrating for each frame, the assignment and data sent to the particular MS based on the CQI received by the BS.

As illustrated in FIG. 9, at each frame, MS1 and MS2 will each send a CQI to the BS. Based on these two parameters, the BS will in turn choose a MS based on an internal algorithm that takes into account, among other factors, the CQI reports from all mobile stations and it will transmit a assignment information, such as within a header, to the selected MS. The BS will also send data to this MS at a slightly later time, as shown in FIG. 8.

Implementation of TDM Scheduling Scheme for Link Adaptation in a GSM/GPRS/EDGE System HSD-PRS (High Speed Downlink GPRS) allows the bundling of several timeslots in order to create a Data Optimized/Data Voice (DO/DV) like shared channel. As such, HSD-PRS introduces concepts such as fast feedback, fast CQI reporting, and so forth, within the existing GSM/GPRS/EDGE framework. Channel estimation and CQI measurements are an important process in HSD-PRS since the optimal allocation of the downlink resources is based on them.

Figure 13:
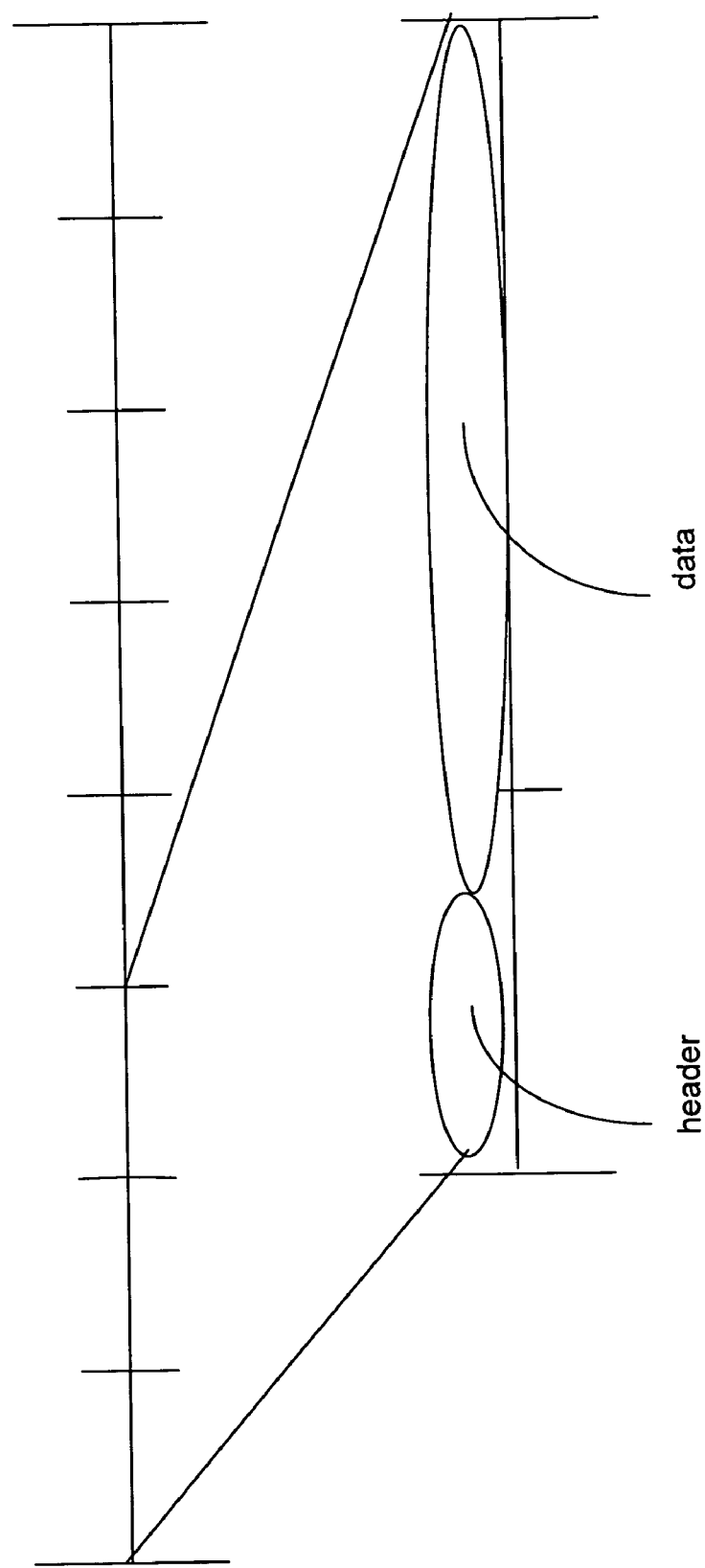
FIG. 13 is a diagram showing the bundling of several timeslots into one channel.

As demonstrated in FIG. 13, HSD-PRS bundles together several timeslots into one channel, which is then directed towards a single user. All terminals will be able to receive those timeslots and read the header. The header indicates which, among the terminals sharing the HSD-PRS channel, is the intended recipient. The receiving terminal must read the data part, whereas all the other terminals can read none, a portion, or all of the data part.

Figure 14:
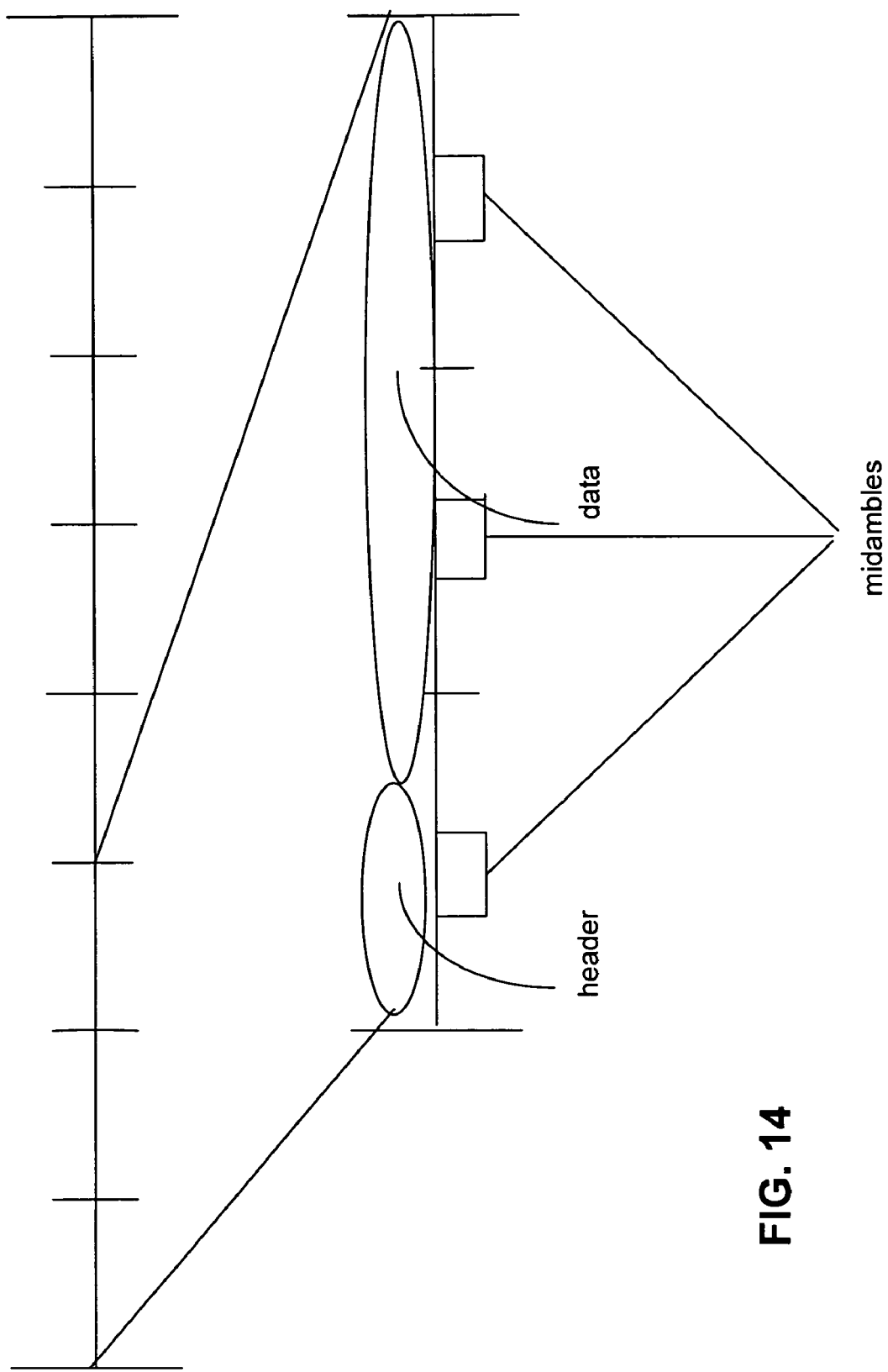
FIG. 14 is a diagram demonstrating timeslots containing midambles used for channel estimation and CQI reporting.

For the purpose of reporting, the important part of a timeslot is the midamble, as shown in FIG. 14. Every timeslot contains a midamble or center point. The MS uses the midamble for channel estimation and CQI measurements. Consequently, every terminal will read a certain number of timeslots within a TDMA frame of the HSD-PRS channel. It will then average the measurement and estimation performed over each of the timeslots. This average will be more accurate if the terminal has been reading all the downlink timeslots. The accuracy of such reporting can therefore be included in the report itself, so that the network can weigh the reports accordingly. The reports, together with the weights, will be used by the network to perform fast scheduling of the terminals.

If the transmit power changes dramatically from slot to slot, the CQI reporting may be affected and the base station would have to adjust its scheduling accordingly. In such a case, the mobile station should report which slots were considered in the estimate of the CQI, so that the base station can compensate for the CQI value with an offset, which may be a function of the transmit power in each of the slots that were used by the mobile station for the CQI estimate.

Reporting is a fundamental part of HSD-PRS. The network will perform a fast scheduling of the downlink resource based on such reporting. Fast scheduling takes place on a TDMA frame basis. It includes both the decision of which user is the recipient of the information sent on that TDMA frame, as well as the coding and modulation parameters. Since the HSD-PRS spans over multiple timeslots within a TDMA frame, the corresponding uplink timeslots can be used for reporting. Reporting is based on channel estimation. This is in turn performed by the terminals on the midambles transmitted on the downlink.

As described in the previous section, a design choice has been done to prevent the terminals from having to transmit and receive at the same time. Due to the GSM offset of three timeslots between transmitting and receiving, it is possible to achieve this. However, some of the terminals will have to interrupt the channel estimation early in order to start transmitting on the uplink. One timeslot of separation is needed between the reception and transmission if the mobile station does not support simultaneous reception and transmission, which is the most common case.

Figure 10:
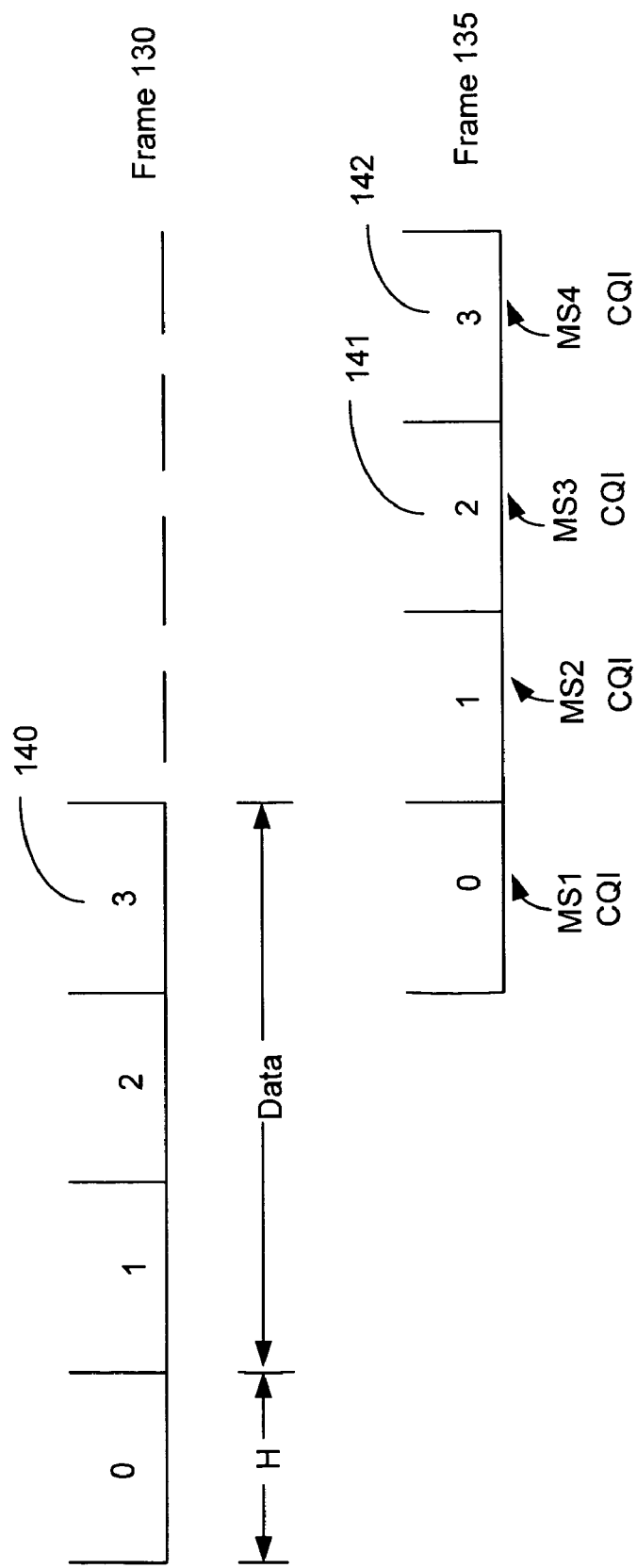
FIG. 10 is a diagram demonstrating the assignment and data information being sent on parts of a frame.

By implementing the allocation of CQI and fast scheduling offered by the TDM scheduling scheme into GSM, it is possible to obtain a more advanced system with increased capacity. As shown in FIG. 10, each MS will send a CQI report to the BS on the MS Tx frame 135. That is, MS1 will send its CQI on timeslot 0, MS2 will send its CQI on timeslot 1, and so forth. Based on the values of the CQI received by the BS, the BS will send the header(H)/data information on the BS Tx frame 130 to the user selected based an all CQI reports. In FIG. 7, as an example, the MS with the highest CQI could be selected. A fairer scheduler would also consider the past history of allocations, the amount of data that needs to be transmitted to the MS, and the priority of the data that needs to be transmitted to the MS. An example of a scheduler is a "proportional fair" scheduler which considers requested data rate and throughput in scheduling transmissions. Again there is an offset of three timeslots between the two frames because the MS may not be able to receive and transmit at the same time. One timeslot may be used to transmit the header information. Each user will read the header information and will know which user the data is intended for. Note that this header may contain information regarding different modulations applying various data rates. Other methods of scheduling may also be used.

In conventional systems, the BSC decided which timeslots were to be used for data transmission and which ones for fast scheduling (header information), at what frequency the information was to be sent, and which users were entitled to use the resources. In the present invention, these tasks are no longer performed by the BSC, but are now assigned to the BS. This allows for even faster scheduling and thus increasing the overall system capacity, since higher order modulations (e.g. 8PSK) requiring good channel condition can be used more often.

Figure 11:
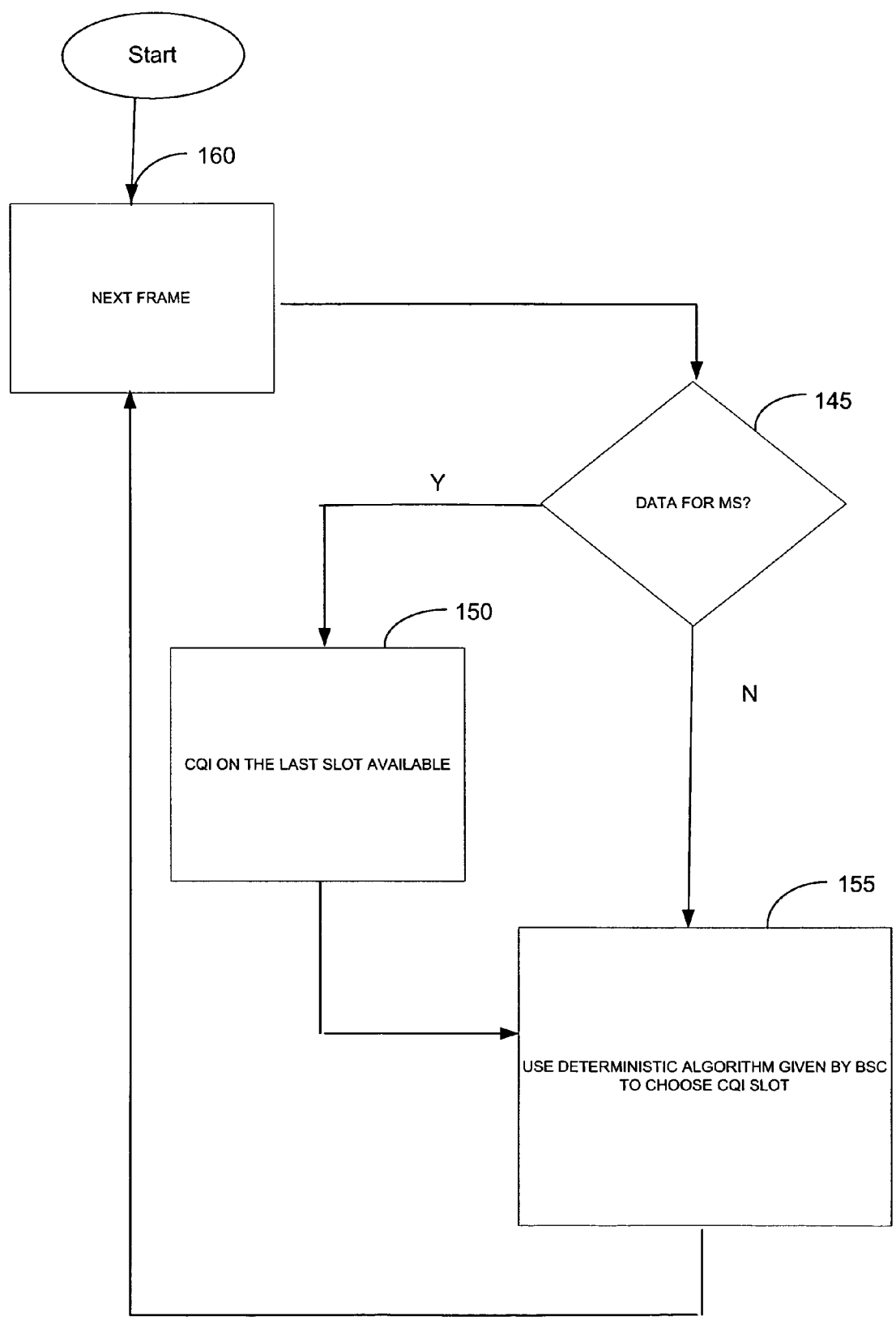
FIG. 11 is a flowchart illustrating an algorithm for rotating the position of users on a frame such that each user will benefit from measuring all timeslots of the frame resulting in better channel quality.

Referring to FIG. 10, as the number of timeslots increase in a frame, the CQI becomes more reliable and accurate. As mentioned above, the average measurement and estimation becomes more accurate when the terminal has been reading all the transmit timeslots. Therefore, MS3 and MS4 will provide the most reliable CQI estimate because timeslots 141 and 142 of the UL 135 can measure all BS Tx 130 slots. In order for each user to benefit from receipt of maximum data due to the position of the timeslot in the frame, an algorithm which rotates the MS users is designed. FIG. 11 is a flowchart that incorporates such an algorithm. In block 145, the receiving unit in the MS will determine whether the data is intended for the MS. If it is, the MS will (block 150) position itself on the last timeslot available in order to prepare for proper transmission of the data. If the data is not intended for the MS, the algorithm in block 155 performs a clockwise or counter-clockwise rotation of users enabling the correct MS to receive the data on the last timeslot available. The order of the reports from the mobile stations that are not receiving the downlink is changed. This rotation ensures fairness, since the timeslot where the uplink report takes place determines also the accuracy of the report itself. These steps will be repeated for the next frame as indicated by block 160. This algorithm also makes sure that two users are not transmitting on the same timeslot.

Figure 12:
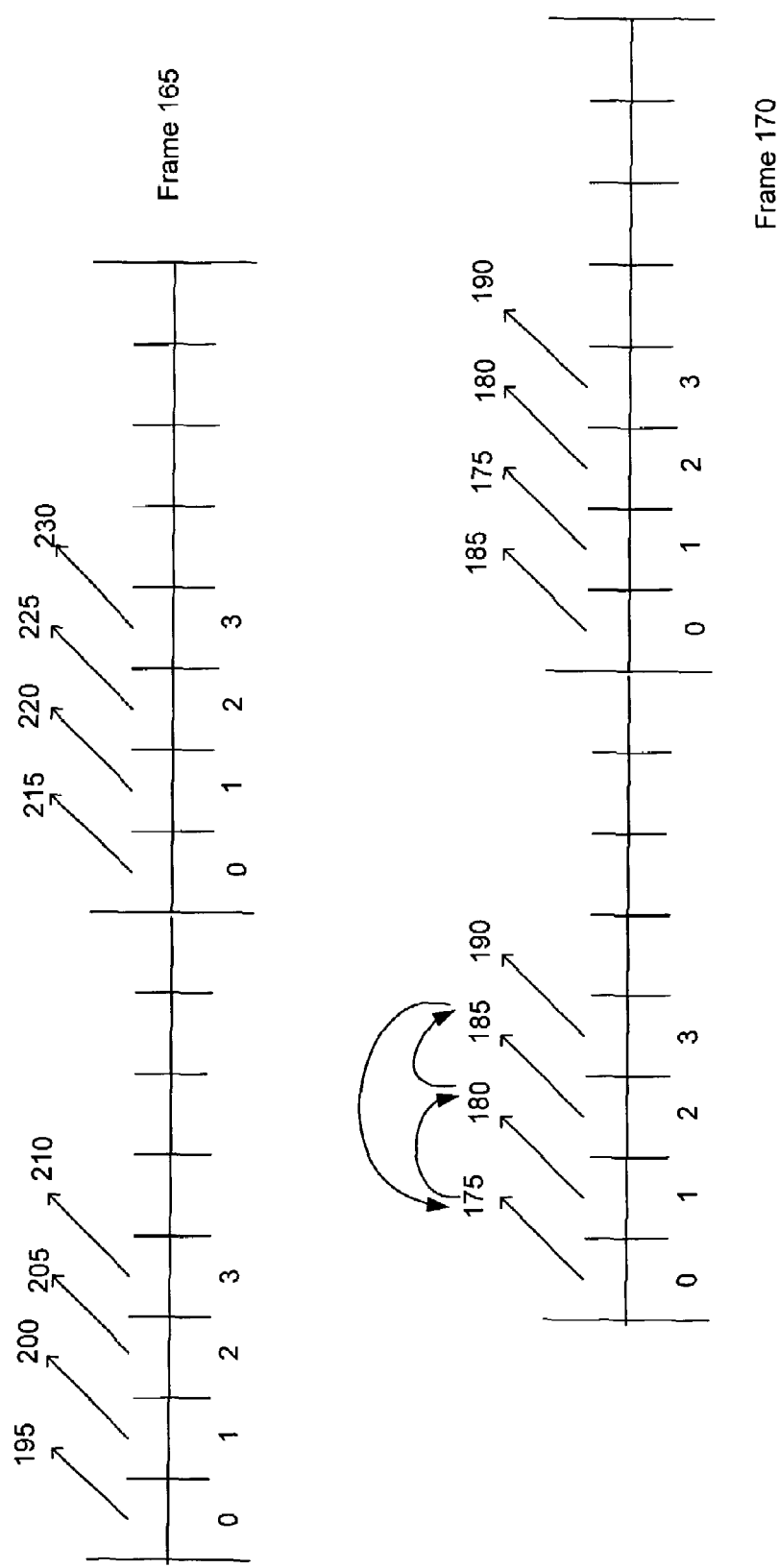
FIG. 12 is a diagram illustrating the position of the MS users after performing the algorithm of rotation of FIG. 11.

By way of another example, as observed in FIG. 12, timeslot 175 of the Rx frame 170 can measure only timeslots 195 and 200 of the Tx frame 165. Timeslot 180 of the Rx frame 170 can measure timeslots 195, 200, and 205 of the Tx frame 165. Finally, timeslots 185 and 190 of the BS Rx frame 170 can measure all timeslots 195, 200, 205, and 210 of the Tx frame 165. In this example, timeslot 190 is always receiving data. Timeslot 190 stays in the same position because it is still receiving data. After rotation as shown in the second part of the Rx frame 170, using the above-mentioned algorithm, timeslot 180 is now located at the third position on Rx frame 170. Because of its new position, timeslot 180 can now measure all timeslots 215, 220, 225, and 230 of the Tx frame 165. This system ensures fairness in receipt of data. The algorithm will provide rotation of users such that each one will benefit from receipt of maximum data. One embodiment incorporates a "proportional fair" scheduler mechanism into the rotation algorithm. In this way, the rotation considers both channel quality and throughput.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a communications system supporting a Global System for Mobile communications (GSM) protocol and a down link communication channel having frames of a first plurality of time slots, wherein each time slot of said first plurality may be scheduled for only one of a plurality of mobile stations, and an up link communication channel having frames of a second plurality of time slots, wherein each time slot of said first plurality may be scheduled for only one of said plurality of mobile stations, a method comprising:
   determining at a mobile station whether data in a frame of said down link communication channel is directed to said mobile station;
   if said data is directed to said mobile station, scheduling the mobile station for a last time slot in a frame of said second plurality of time slots; and
   if said data is not directed to said mobile station, scheduling a selected mobile station for said last time slot in a frame of said second plurality of time slots.

2. The method according to claim 1, wherein the second plurality of time slots in a frame are scheduled by a proportional fair scheduler.

3. The method according to claim 1, wherein a mobile station capable of receiving a best average of said data and not currently receiving said data is scheduled for the next to last time slot in a frame of said second plurality of time slots.

4. The method according to claim 3, wherein said next to last time slot scheduling is accomplished by a clockwise rotation in a time schedule for said mobile station capable of receiving the best average of said data.

5. The method according to claim 3, wherein said next to last time slot scheduling is accomplished by a counter-clockwise rotation in a time schedule for said mobile station capable of receiving the best average of said data.

6. The method according to claim 1, wherein said selected mobile station is identified in a header of accompanying said data.

7. The method according to claim 1, wherein, if said data is not directed to said mobile station, an algorithm rotates a time slot scheduled for said mobile station based on a requested data rate.

8. The method according to claim 1, wherein, if said data is not directed to said mobile station, an algorithm rotates a time slot scheduled for said mobile station based on a channel quality indicator.

9. The method according to claim 1, wherein, if said data is not directed to said mobile station, an algorithm rotates a time slot scheduled for said mobile station based on a mobile station selection history.

10. The method according to claim 1, wherein the communication system supports a General Packet Radio Service (GPRS) protocol.

11. The method according to claim 1, wherein the system supports an Enhanced Data rates for a Global Evolution (EDGE) protocol.

12. The method according to claim 1, wherein the communication system supports said Global System for Mobile communications (GSM) protocol.

13. A communications system supporting a Global System for Mobile communications (GSM) protocol, comprising:
   a down link communication channel having frames of a first plurality of time slots, wherein each time slot of said first plurality may be scheduled for only one of a plurality of mobile stations;
   an up link communication channel having frames of a second plurality of time slots, wherein each time slot of said second plurality may be scheduled for only one of said plurality of mobile stations;

means for determining at a mobile station whether data in a frame of said down link communication channel is directed to said mobile station; and means for scheduling the mobile station for a last time slot in a frame of said second plurality of time slots if said data is directed to said mobile station, and scheduling a selected mobile station for said last time slot in a frame of said second plurality of time slots if said data is not directed to said mobile station.

14. The communications system according to claim 13, wherein said selected mobile station is identified in a header of accompanying said data.

15. The communication system according to claim 13, wherein, if said data is not directed to said mobile station, said means for scheduling rotates a time slot scheduled for said mobile station based on a requested data rate.

16. The communication system according to claim 13, wherein, if said data is not directed to said mobile station, said means for scheduling rotates a time slot scheduled for said mobile station based on a channel quality indicator.

17. The communication system according to claim 13, wherein, if said data is not directed to said mobile station, said means for scheduling rotates a time slot scheduled for said mobile station based on a mobile station selection history.

18. The communication system according to claim 13, wherein the communication system supports a General Packet Radio Service (GPRS) protocol.

19. The communication system according to claim 13, wherein the communication system supports an Enhanced Data rates for a Global Evolution (EDGE) protocol.

20. The communication system according to claim 13, wherein the communication system supports said Global System for Mobile communications (GSM) protocol.

21. A communications system supporting a Global System for Mobile communications (GSM) protocol, comprising:

a down link communication channel having frames of a first plurality of time slots, wherein each time slot of said first plurality may be scheduled for only one of a plurality of mobile stations;

an up link communication channel having frames of a second plurality of time slots, wherein each time slot of said second plurality may be scheduled for only one of said plurality of mobile stations; and a controller operatively coupled to said down link and said up link, wherein said controller determines whether data in a frame of said down link communication channel is directed to a mobile station, and said controller schedules said mobile station for a last time slot in a frame of said second plurality of time slots if said data is directed to said mobile station, and schedules a selected mobile station for said last time slot in a frame of said second plurality of time slots if said data is not directed to said mobile station.

22. The communications system according to claim 21, wherein said selected mobile station is identified in a header of accompanying said data.

23. The communication system according to claim 21, wherein, if said data is not directed to said mobile station, said controller rotates a time slot scheduled for said mobile station based on a requested data rate.

24. The communication system according to claim 21, wherein, if said data is not directed to said mobile station, said controller rotates a time slot scheduled for said mobile station based on a channel quality indicator.

25. The communication system according to claim 21, wherein, if said data is not directed to said mobile station, said controller rotates a time slot scheduled for said mobile station based on a mobile station selection history.

26. The communication system according to claim 21, wherein the communication system supports a General Packet Radio Service (GPRS) protocol.

27. The communication system according to claim 21, wherein the communication system supports an Enhanced Data rates for a Global Evolution (EDGE) protocol.

28. The communication system according to claim 21, wherein the communication system supports said Global System for Mobile communications (GSM) protocol.

* * * * *